US009035801B2

(12) United States Patent
Nikolic et al.

(10) Patent No.: US 9,035,801 B2
(45) Date of Patent: May 19, 2015

(54) FLIGHT DECK LIGHTING FOR INFORMATION DISPLAY (71) Applicant: The Boeing Company, Chicago, IL (US)

(72) Inventors: Mark Ivan Nikolic, Seattle, WA (US); Stephen J. Minarsch, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 156 days.

(21) Appl. No.: 13/761,919

(22) Filed: Feb. 7, 2013

(65) Prior Publication Data
US 2014/0218215 A1    Aug. 7, 2014

(51) Int. Cl.
*G08B 21/00* (2006.01)
*B64D 43/00* (2006.01)
*H05B 33/08* (2006.01)
*H05B 37/02* (2006.01)
*G01C 23/00* (2006.01)

(52) U.S. Cl.
CPC .............. *B64D 43/00* (2013.01); *G01C 23/005* (2013.01); *G09G 2330/12* (2013.01); *G09G 2360/144* (2013.01); *H05B 33/0845* (2013.01); *H05B 33/0854* (2013.01); *H05B 37/0218* (2013.01)

(58) Field of Classification Search
CPC .......... G01C 23/005; G09G 2360/144; G09G 2330/12

USPC .............. 340/945; 244/50; 345/207; 250/221
See application file for complete search history.

(56) References Cited

U.S. PATENT DOCUMENTS

| | | | |
|---|---|---|---|
| 6,247,825 B1 | 6/2001 | Borkowski | |
| 7,260,453 B2 | 8/2007 | Poier et al. | |
| D591,665 S | 5/2009 | Saint-Jalmes et al. | |
| D610,521 S | 2/2010 | Pirie et al. | |
| 2007/0142980 A1 | 6/2007 | Ausman et al. | |
| 2008/0048101 A1* | 2/2008 | Romig et al. | 250/221 |
| 2010/0204855 A1 | 8/2010 | Vial | |
| 2012/0105253 A1 | 5/2012 | Lillis et al. | |
| 2012/0168557 A1* | 7/2012 | Edelson et al. | 244/50 |
| 2013/0207947 A9* | 8/2013 | Davies | 345/207 |

FOREIGN PATENT DOCUMENTS

WO   WO2008088575 A1   7/2008
WO   WO2011066399 A1   6/2011

OTHER PUBLICATIONS

International Search Report and Written Opinion, dated Jul. 11, 2014, regarding Application No. PCT/US2013/067624, 11 pages.

* cited by examiner

*Primary Examiner* — Shirley Lu
(74) *Attorney, Agent, or Firm* — Yee & Associates, P.C.

(57) ABSTRACT

A method and apparatus for lighting a flight deck on an aircraft. A status of the aircraft is identified by a processor unit. The processor unit controls the lighting on the flight deck in response to the status of the aircraft to indicate the status of the aircraft.

19 Claims, 4 Drawing Sheets

FLIGHT DECK LIGHTING FOR INFORMATION DISPLAY

BACKGROUND INFORMATION

1. Field

The present disclosure relates generally to systems and methods for lighting the interior of an aircraft. More particularly, the present disclosure relates to providing and controlling lighting on the flight deck of an aircraft to provide information to the flight crew on the status of the aircraft and for controlling the aircraft.

2. Background

A flight deck is the area on an aircraft from which a pilot and other flight crew members control the aircraft. The flight deck is usually located near the front of an aircraft. The flight deck also may be referred to as the cockpit. In addition to a pilot, the flight crew on the flight deck during operation of the aircraft may include, for example, a copilot, a navigator, or other personnel or combinations of personnel.

The flight deck of an aircraft includes the instruments and controls that enable the flight crew to operate the aircraft. For example, the flight deck may include a number of displays. Various types of information may be displayed on the flight deck displays for use by the flight crew to operate the aircraft. For example, the information displayed on the various flight deck displays may indicate the status of various systems on the aircraft. The flight crew may operate the controls on the flight deck to control the operation of the various systems on the aircraft in response to the information displayed on the various flight deck displays.

The flight crew may monitor all of the information displayed on all of the flight deck displays during operation of the aircraft. It may be desirable that the attention of the flight crew is focused on particular displays on the flight deck when the information being presented on such displays is of particular importance for effective operation of the aircraft. At the same time, however, it may be desirable that the flight crew also is aware of changes in the information displayed on other displays on the flight deck. For example, it may be desirable that the attention of the flight crew may be shifted to such other displays when the information being presented on such other displays becomes more important for effective operation of the aircraft.

It also may be desirable that the attention of the flight crew may be drawn to particular controls on the flight deck that may be operated by the flight crew to control particular systems on the aircraft when the control of such systems is of particular importance for effective operation of the aircraft. For example, it may be desirable that the flight crew operates particular controls on the flight deck in a particular way to control the status of various systems on the aircraft in an effective manner.

Accordingly, it would be beneficial to have a method and apparatus that takes into account one or more of the issues discussed above as well as possibly other issues.

SUMMARY

A first illustrative embodiment provides a method for lighting a flight deck on an aircraft. A status of the aircraft is identified by a processor unit. The processor unit controls the lighting on the flight deck in response to the status of the aircraft to indicate the status of the aircraft.

Another illustrative embodiment provides an apparatus comprising a status identifier and a lighting control signal generator. The status identifier is configured to identify a status of a platform. The lighting control signal generator is configured to generate lighting control signals for controlling lighting on the platform in response to the status of the platform to indicate the status of the platform.

Another illustrative embodiment provides a method for controlling lighting on a platform. A status of a number of systems on the platform is identified by a processor unit. The processor unit controls the lighting on the platform associated with a number of controls on the platform in response to the status of the number of systems, wherein the number of controls are configured for controlling the number of systems.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

DETAILED DESCRIPTION

The different illustrative embodiments recognize and take into account a number of different considerations. "A number," as used herein with reference to items, means one or more items. For example, "a number of different considerations" means one or more different considerations.

The different illustrative embodiments recognize and take into account that most of the information displayed on the flight deck of an aircraft may rely on focal visual attention of the flight crew to extract precise numbers, values, and parameters from various flight deck displays. A pilot, or other member of the flight crew, may attend to and process this information in serial order to monitor the status of the aircraft and control the operation of the aircraft. It may be desirable, however, for the flight crew to be able to monitor efficiently multiple indications of the status of the aircraft in parallel.

The illustrative embodiments also recognize and take into account that the amount of physical space that may be used for displaying information on the flight deck of an aircraft may be limited. Integrating information displays around and within physical controls on the flight deck may provide additional display capability in the limited physical space available on the flight deck.

In accordance with an illustrative embodiment, lighting on the flight deck of an aircraft may be used to communicate the status of various aircraft systems to the flight crew. Various characteristics of the lighting on the flight deck may be controlled in response to the status of the aircraft systems in a manner such that the flight crew may identify the status of a system in parallel with other visual tasks.

In accordance with an illustrative embodiment, individual displays or other areas on the flight deck may be illuminated in a controlled manner to convey information about the status of aircraft systems associated with those displays or other areas on the flight deck. Overall ambient lighting in the flight deck cabin may be controlled to convey more general information regarding the status of the aircraft.

In accordance with an illustrative embodiment, lighting on the flight deck of an aircraft may be used to guide the action of the flight crew to control the status of various systems on the aircraft. For example, lighting on the flight deck may be controlled to cue different interface locations where attention or action by the flight crew may be desired. In accordance with an illustrative embodiment, lighting on the flight deck may be controlled to draw attention to specific controls for performing tasks to be performed by the flight crew. Lighting on the flight deck also may be controlled to indicate how specific controls may be operated by the flight crew to control the status of specific aircraft systems in a desired manner.

Figure 1:
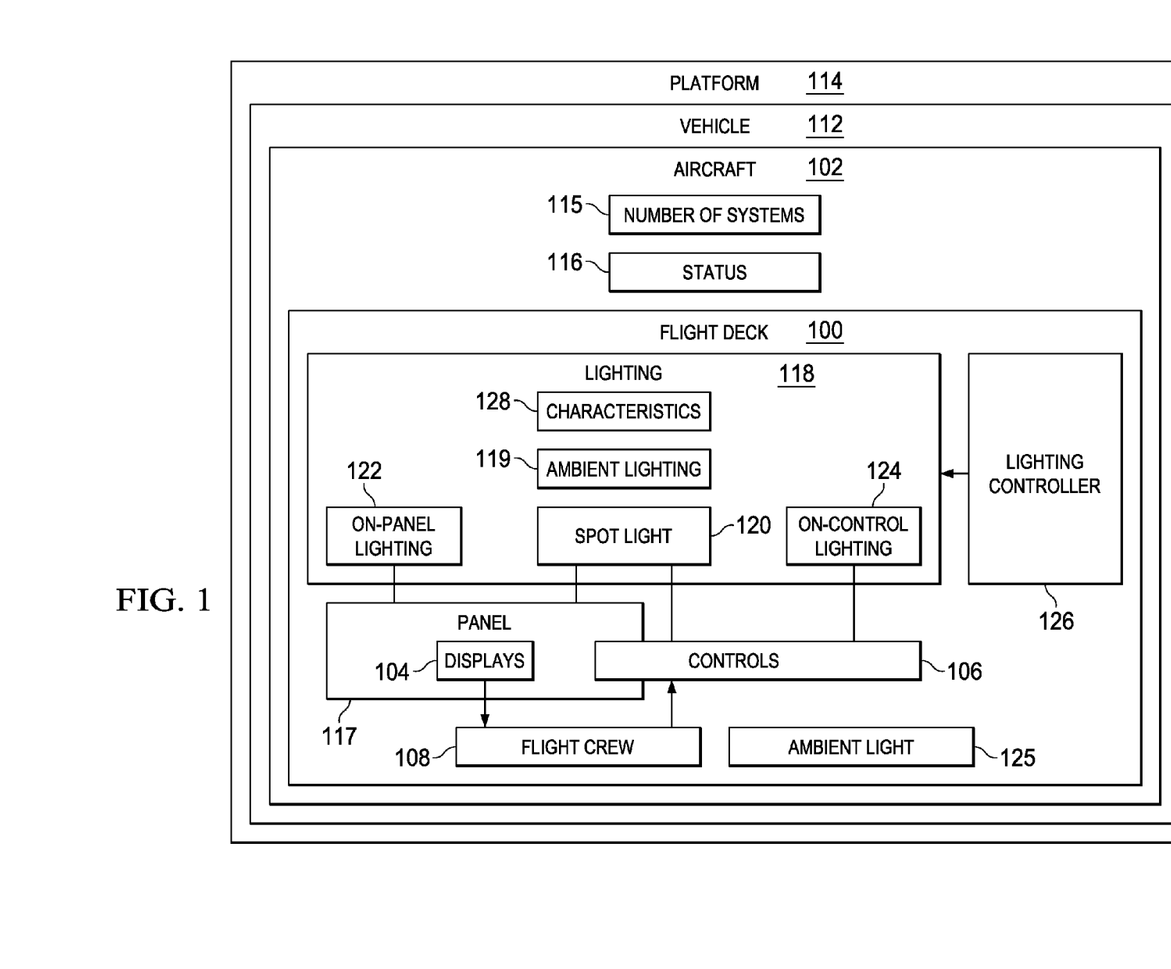
FIG. 1 is an illustration of a block diagram of a flight deck on an aircraft in accordance with an illustrative embodiment.

Turning now to FIG. 1, an illustration of a block diagram of a flight deck on an aircraft is depicted in accordance with an illustrative embodiment. In this illustrative example, flight deck 100 may be a flight deck on aircraft 102. Flight deck 100 also may be referred to as the cockpit of aircraft 102. For example, without limitation, flight deck 100 may include an area located near the front of aircraft 102. Flight deck 100 may include various displays 104 and controls 106 which enable flight crew 108 to control the operation of aircraft 102. For example, without limitation, flight crew 108 may include a pilot, a copilot, a navigator, other personnel, or various combinations of personnel for controlling the operation of aircraft 102.

The location of flight deck 100 on aircraft 102, the composition of flight crew 108, the number and types of devices and systems used to implement displays 104 and controls 106, and the information displayed to flight crew 108 on displays 104 may depend on various factors including, for example, without limitation, the type of aircraft 102, the operations to be performed by aircraft 102, specific flight or mission requirements, or other factors or various combinations of factors.

Aircraft 102 may be any type of aircraft. For example, without limitation, aircraft 102 may include a fixed wing, rotary wing, or lighter than air aircraft. Aircraft 102 may be configured for carrying passengers, cargo, both passengers and cargo, or may be used for performing any other operation or mission. Aircraft 102 may be operated by an airline, a military unit, or any other private or governmental entity.

Aircraft 102 is an example of vehicle 112 in which illustrative embodiments may be implemented. Illustrative embodiments may be implemented in types of vehicles other than aircraft 102. For example, without limitation, vehicle 112 may be any vehicle that is configured for travelling through the air, in space, on land, on the surface of water, underwater, or in any other environment or combination of environments.

Vehicle 112 is an example of platform 114 in which illustrative embodiments may be implemented. Illustrative embodiments may be implemented in types of platforms other than vehicle 112. For example, platform 114 may include any fixed or movable structure or facility that may be controlled by an operator using information that is displayed to the operator on one or more displays 104 and using one or more controls 106.

In cases where illustrative embodiments are implemented on vehicle 112 or platform 114 other than aircraft 102, displays 104 and controls 106 may be provided in one or more areas or locations on vehicle 112 or platform 114 where functions corresponding to the functions performed on flight deck 100 for aircraft 102 are performed for vehicle 112 or platform 114. For example, without limitation, displays 104 and controls 106 may be provided in a control room or one or more other areas or combinations of areas on vehicle 112 or platform 114 from which a human operator may control operation of vehicle 112 or platform 114 using controls 106 and the information displayed on displays 104. Illustrative embodiments may be used to control the lighting in an area of vehicle 112 or platform 114 to improve the performance of operations that may be like those performed on flight deck 100 for aircraft 102, even though such an area may not be referred to as a flight deck or a cockpit.

Continuing with the example of aircraft 102, aircraft 102 may include number of systems 115. Number of systems 115 may include various systems and devices for performing various functions on aircraft 102. For example, without limitation, number of systems 115 may include power systems, flight control systems, warning systems, navigation systems, communication systems, environmental control systems, data processing systems, other systems, or various combinations of systems for performing various functions on aircraft 102.

Displays 104 may be a number of displays in this illustrative example. Displays 104 may include any number of devices or systems for displaying various types of information on flight deck 100. For example, without limitation, displays 104 may include screen displays, number displays, dials, indicator lights, or any other device or combination of devices for displaying various types of information. The information displayed on displays 104 may be used by flight crew 108 to control operation of aircraft 102.

Displays 104 may be configured to display information regarding status 116 of aircraft 102. Status 116 of aircraft 102 may include a general status of aircraft 102, status of number of systems 115 on aircraft 102, or both. Status 116 may refer to any condition, state, setting, or parameter of aircraft 102, number of systems 115, or both.

Controls 106 may be a number of controls in this illustrative example. Controls 106 may include any number of devices or systems that may be operated by flight crew 108 to control operation of aircraft 102. For example, without limitation, controls 106 may include touch screens, dials, switches, levers, wheels, other devices, or various combinations of devices for controlling number of systems 115 on aircraft 102. Controls 106 may be configured to be operated by flight crew 108 to control status 116 of number of systems 115.

Displays 104 and controls 106 may be positioned at various appropriate locations on flight deck 100. For example, without limitation, some or all of displays 104, controls 106, or both may be located on panel 117 on flight deck 100. Panel 117 may comprise a support structure including a surface on which displays 104, controls 106, or both may be mounted otherwise attached. Panel 117 may be one of a number of panels on flight deck 100 on which displays 104, controls 106 or both are mounted.

Light on flight deck 100 may be provided by lighting 118. Lighting 118 may include various devices for providing light in various areas of flight deck 100. For example, without limitation, lighting 118 may include ambient lighting 119, spotlight 120, on-panel lighting 122, and on-control lighting 124.

Ambient lighting 119 may include general lighting for flight deck 100. Ambient lighting 119 may include lighting for all or most of flight deck 100. For example, without limitation, ambient lighting 119 may be provided by lighting devices located in the ceiling of flight deck 100 or at other locations or various combinations of locations on flight deck 100.

Ambient lighting 119 may be one component of ambient light 125 on flight deck 100. Ambient light 125 may refer to the general light conditions in all or most of flight deck 100. Another component of ambient light 125 on flight deck 100 may be sunlight or other light coming in through windows on flight deck 100.

Spotlight 120 may include any device that may be configured and positioned on flight deck 100 to direct a beam of light to illuminate particular displays 104, particular controls 106, or a particular area on panel 117. For example, without limitation, spotlight 120 may be configured and positioned to illuminate a selected one or more of displays 104 on panel 117. As another example, spotlight 120 may be configured and positioned to illuminate a selected one or more of controls 106, or selected portions of one or more of controls 106. Spotlight 120 that is configured and positioned to illuminate particular displays 104, particular controls 106, or a particular area on panel 117 may be defined as being associated with such particular displays 104, particular controls 106, or a particular area on panel 117.

On-panel lighting 122 may include lighting devices that may be attached to, embedded in, or otherwise mounted on panel 117. On-panel lighting 122 may include individually controllable lighting devices or groups of lighting devices that are positioned on panel 117 so as to be associated with particular displays 104, controls 106, or both on panel 117. For example, without limitation, on-panel lighting 122 may be associated with particular displays 104, controls 106, or both by being positioned on panel 117 adjacent to such displays 104, controls 106, or both. As another example, without limitation, on-panel lighting 122 may be associated with particular displays 104, controls 106, or both by being positioned on panel 117 so as to fully or partially surround such displays 104, controls 106, or both, or in a configuration that points to such displays 104, controls 106, or both.

On-control lighting 124 may include lighting devices that may be attached to, embedded in, or otherwise mounted on controls 106. On-control lighting 124 may be defined as being associated with controls 106 on which on-control lighting 124 is mounted.

Any appropriate lighting devices may be used to implement lighting 118. For example, without limitation, light emitting diodes, electroluminescent lighting devices, or other lighting devices or combinations of lighting devices may be used to implement lighting 118. For example, without limitation, a laser pointer or other lighting device that provides a relatively narrow beam of light may be used to implement spot light 120. Lighting devices used to implement spot light 120, on-panel lighting 122, and on-control lighting 124 may be selected to provide light with enough intensity to be readily visible by flight crew 108 under the typically brightest expected conditions for ambient light 125 on flight deck 100. Lighting devices used to implement lighting 118 may be mounted at desired positions on flight deck 100, on panel 117, and on controls 106 using any appropriate mounting devices or structures.

In accordance with an illustrative embodiment, lighting controller 126 may be configured to control lighting 118 on flight deck 100 to indicate status 116 of aircraft 102 to flight crew 108. Lighting controller 126 may be configured to control various characteristics 128 of lighting 118 to indicate status 116 of aircraft 102.

For example, lighting controller 126 may be configured to control ambient lighting 119 on flight deck 100 to indicate generally status 116 of aircraft 102. Lighting controller 126 may be configured to control spot light 120 and on-panel lighting 122 associated with displays 104 to draw the attention of flight crew 108 to displays 104 for displaying information regarding status 116 of number of systems 115 on aircraft 102. Lighting controller 126 also may be configured to control spot light 120, on-panel lighting 122, and on-control lighting 124 associated with controls 106 to draw the attention of flight crew 108 to controls 106 for controlling status 116 of number of systems 115. Lighting controller 126 also may be configured to control on-control lighting 124 on controls 106 to guide action by flight crew 108 to use controls 106 to control status 116 of number of systems 115.

Lighting controller 126 also may be configured to control spot light 120, on-panel lighting 122, and on-control lighting 124 in response to ambient light 125 on flight deck 100. For example, lighting controller 126 may be configured to control the brightness of spot light 120, on-panel lighting 122, and on-control lighting 124 in response to ambient light 125 on flight deck 100 in an appropriate manner so that the light provided by spot light 120, on-panel lighting 122, and on-control lighting 124 is readily visible by flight crew 108 when the level of ambient light 125 on flight deck 100 is relatively high but is not so bright so as to be distracting when the level of ambient light 125 is relatively low.

Figure 2:
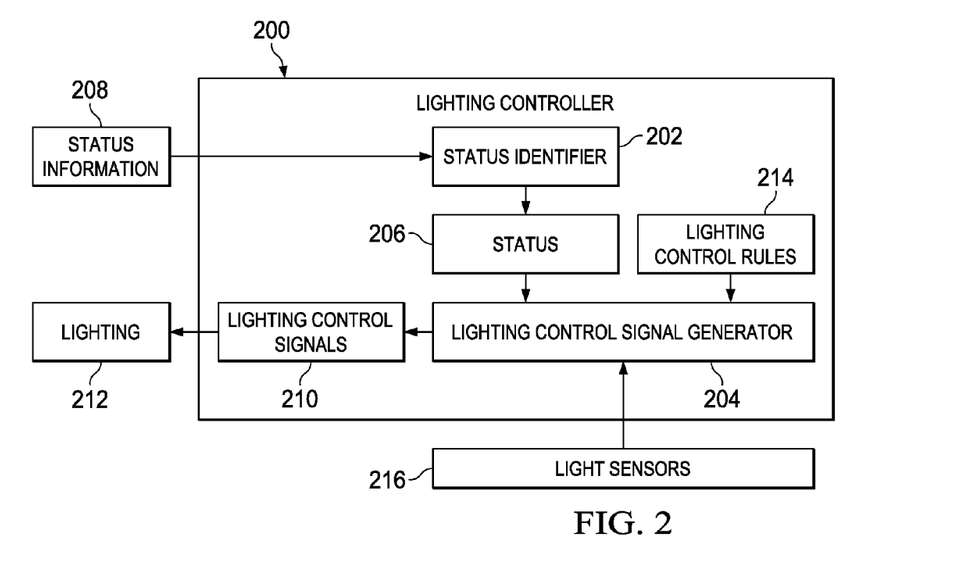
FIG. 2 is an illustration of a block diagram of a lighting controller in accordance with an illustrative embodiment.

Turning now to FIG. 2, an illustration of a block diagram of a lighting controller is depicted in accordance with an illustrative embodiment. In this example, lighting controller 200 is an example of one implementation of lighting controller 126 in FIG. 1. For example, without limitation, the functionality of lighting controller 200 as described herein may be implemented in a data processing system located on the flight deck or at another location on an aircraft. Lighting controller 200 may include status identifier 202 and lighting control signal generator 204.

Status identifier 202 may be configured to identify status 206 of various systems on an aircraft. Status identifier 202 may be configured to identify status 206 from status information 208 that may be provided by various systems on the aircraft.

Lighting control signal generator 204 may be configured to generate lighting control signals 210 for controlling lighting 212. For example, lighting 212 may include lighting on the flight deck of an aircraft. Lighting 118 in FIG. 1 is an example of one implementation of lighting 212. Lighting control signals 210 may be provided by lighting control signal generator 204 in any appropriate form for controlling lighting 212. Lighting control signals 210 may be provided from lighting controller 200 to lighting 212 via any appropriate wiring or other connection.

Lighting control signals 210 may be configured to control various characteristics of lighting 212 to indicate status 206 of an aircraft to the flight crew on the flight deck of the aircraft. Lighting control signal generator 204 may be configured to generate lighting control signals 210 in response to status 206 provided by status identifier 202 in accordance with lighting control rules 214. Lighting control rules 214 may include various rules defining how lighting 212 on an aircraft may be controlled in response to status 206 of various systems on the aircraft. Lighting control rules 214 may be provided in any appropriate form for use by lighting control signal generator 204.

Lighting control rules 214 also may include rules for controlling the intensity or other characteristics of lighting 212 based on the level of ambient light on the flight deck. For example, light sensors 216 may be used to measure levels of ambient light on the flight deck. Lighting control signal generator 204 may be configured to generate lighting control signals 210 in response to the ambient light on the flight deck as identified by light sensors 216 to adjust the intensity or other characteristics of lighting 212 to provide appropriate contrast and detectability for the given level of ambient light.

Figure 3:
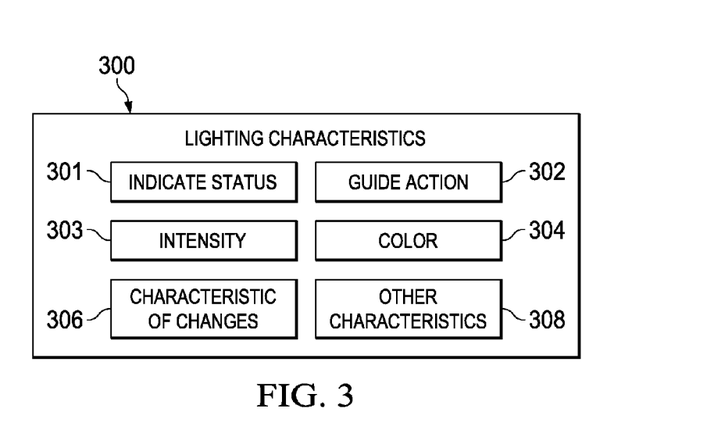
FIG. 3 is an illustration of a block diagram of lighting characteristics in accordance with an illustrative embodiment.

Turning now to FIG. 3, an illustration of a block diagram of lighting characteristics 300 is depicted in accordance with an illustrative embodiment. In this example, lighting characteristics 300 may be examples of characteristics 128 of lighting 118 on flight deck 100 of aircraft 102 in FIG. 1.

In accordance with an illustrative embodiment, lighting characteristics 300 may be controlled to indicate status 301 of an aircraft. Lighting characteristics 300 also may be controlled to guide action 302 by the flight crew on an aircraft. For example, lighting characteristics 300 of lighting associated with controls for controlling various systems on the aircraft may be controlled to guide action 302 by the flight crew to use the controls in an appropriate manner.

For example, without limitation, lighting characteristics 300 that may be controlled to indicate status 301, guide action 302, or both, may include intensity 303, color 304, characteristic of changes 306, and other characteristics 308. Intensity 303 may include whether lighting is off or on as well as various levels of intensity when the lighting is on. Characteristic of changes 306 may include frequency of changes in lighting characteristics 300, a pattern of changes in lighting characteristics 300, or other characteristics of changes or combinations of characteristics of changes in lighting. For example, without limitation, characteristic of changes 306 may include controlling lighting characteristics 300 in a pattern so as to indicate desired movement of a control on an aircraft.

Lighting characteristics 300 of lighting associated with displays, controls, or other areas on the flight deck of an aircraft may be controlled to convey information to indicate status 301 of aircraft systems to the flight crew. For example, without limitation, on-control lighting on the control column of an aircraft may be changed to green or another appropriate color to indicate that autopilot engagement status is on. Lighting characteristics 300 of ambient lighting on the flight deck may be controlled to convey more general information and awareness to indicate status 301 of an aircraft. For example, without limitation, ambient lighting across the flight deck may be changed to red or another appropriate color to indicate a system warning or alert.

Lighting characteristics 300 of lighting on the flight deck of an aircraft may be controlled to guide action 302 by drawing the attention of the flight crew to controls on the flight deck that may be used to perform a desired action. Lighting characteristics 300 also may be controlled to guide action 302 by indicating how a control may be used to perform a desired action. For example, without limitation, on-control lighting on the control wheel of an aircraft may be controlled to pulse in a manner to indicated desired flight control inputs. For example, the lighting on the control wheel may be pulsed to indicate a desired backward motion of the control column to pull up for a traffic avoidance maneuver.

The illustrations of FIGS. 1-3 are not meant to imply physical or architectural limitations to the manner in which illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 4:
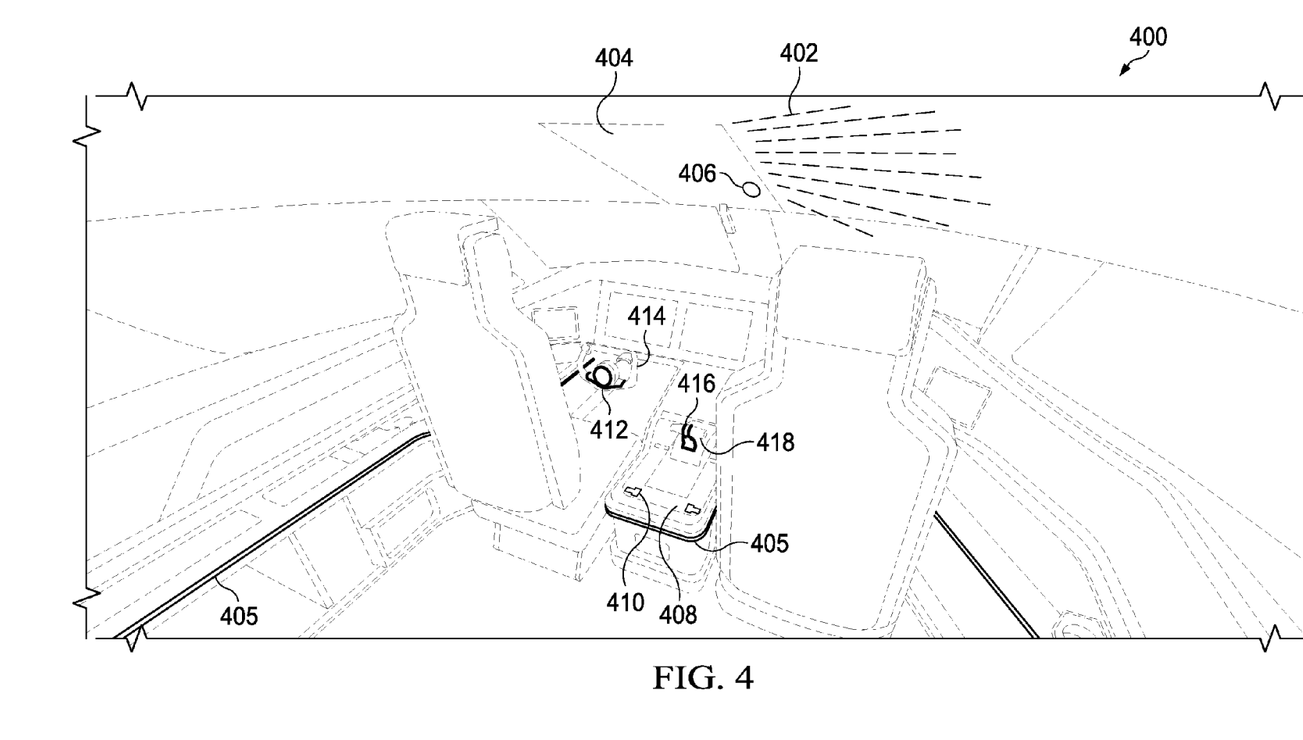
FIG. 4 is an illustration of a flight deck in accordance with an illustrative embodiment.

Turning now to FIG. 4, an illustration of a flight deck is depicted in accordance with an illustrative embodiment. In this example, flight deck 400 is an example of one implementation of flight deck 100 in FIG. 1.

In this example, ambient lighting 402 for flight deck 400 may be provided by lighting devices located overhead in ceiling 404 of flight deck 400. Ambient lighting also may be provided by strip lighting 405 at various locations such as, but not limited to, the side walls and control pedestal (aislestand) on flight deck 400. Spot light 406 may be located on ceiling 404 and configured to direct a beam of light to illuminate a selected area on flight deck 400. For example, spot light 406 may be positioned and configured to illuminate selected displays, selected controls, or a selected area on a panel on flight deck 400.

Various displays and controls may be provided on various panels on flight deck 400. In this example, various displays and controls are provided on panel 408. On-panel lighting 410 on panel 408 may be associated with various displays and controls on panel 408. In this example, on-panel lighting 410 may include lighting strips embedded in panel 408.

On-control lighting may be provided on various controls on flight deck 400. For example, on-control lighting 412 may include lighting strips embedded in control wheel 414. On-control lighting 416 may include lighting strips embedded in thrust lever 418.

Figure 5:
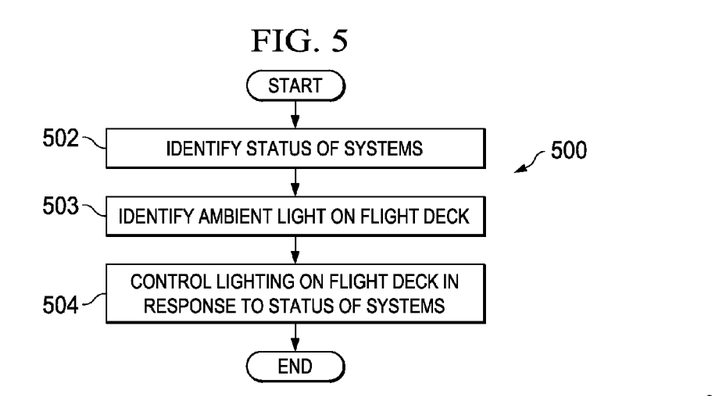
FIG. 5 is an illustration of a flowchart of a process for controlling the lighting on a flight deck in accordance with an illustrative embodiment.

Turning now to FIG. 5, an illustration of a flowchart of a process for controlling the lighting on a flight deck is depicted in accordance with an illustrative embodiment. For example, process 500 may be implemented in lighting controller 126 in FIG. 1 or lighting controller 200 in FIG. 2.

Process 500 may begin by identifying the status of various systems on an aircraft (operation 502). Operation 502 may include identifying the status of various systems on the aircraft using status information provided by various systems on the aircraft.

Ambient light on the flight deck also may be identified (operation 503). For example, a level of ambient light on the flight deck may be identified using light sensors on the flight deck.

Lighting on the flight deck of the aircraft then may be controlled in response to the status of the systems on the aircraft and the ambient light on the flight deck (operation 504) with the process terminating thereafter. For example, operation 504 may include controlling various characteristics of the lighting on the flight deck to provide information to the flight crew on the status of the various systems on the aircraft. Operation 504 may include adjusting the intensity or other characteristics of the lighting on the flight deck to provide adequate contrast and detectability for the given level of ambient light on the flight deck.

Illustrative embodiments therefore provide an apparatus and method for controlling the lighting on a flight deck of an aircraft or another platform. In accordance with an illustrative embodiment, lighting on the flight deck or other platform may be controlled in response to the status of the aircraft or other platform to indicate the status of the aircraft or other platform.

One or more of the illustrative embodiments provides a capability to improve flight crew understanding of aircraft status without requiring visual focus and distraction from displays on the flight deck. The control of on-panel, on-control, and other flight deck lighting in accordance with an illustrative embodiment allows information to be conveyed to the flight crew without requiring the use of additional physical space on the flight deck for additional displays.

Figure 6:
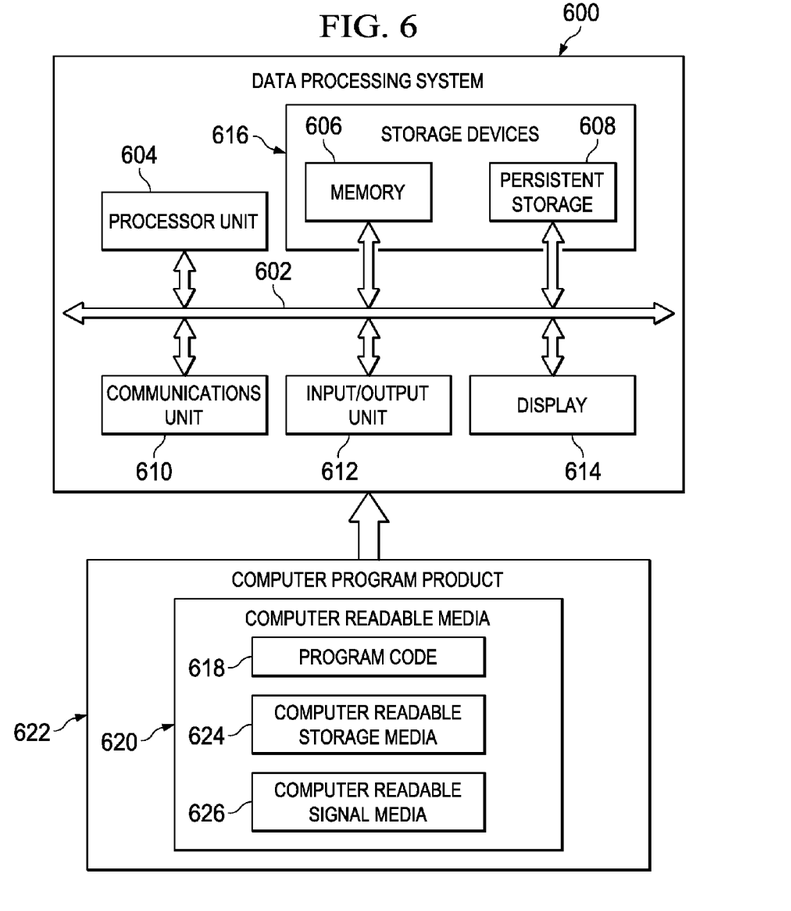
FIG. 6 is an illustration of a block diagram of a data processing system in accordance with an illustrative embodiment.

Turning now to FIG. 6, an illustration of a block diagram of a data processing system is depicted in accordance with an illustrative embodiment. In this example, data processing system 600 is an example of one implementation of a data processing system for implementing lighting controller 126 in FIG. 1 and lighting controller 200 in FIG. 2.

In this illustrative example, data processing system 600 includes communications fabric 602. Communications fabric 602 provides communications between processor unit 604, memory 606, persistent storage 608, communications unit 610, input/output (I/O) unit 612, and display 614. Memory 606, persistent storage 608, communications unit 610, input/output (I/O) unit 612, and display 614 are examples of resources accessible by processor unit 604 via communications fabric 602.

Processor unit 604 serves to run instructions for software that may be loaded into memory 606. Processor unit 604 may be a number of processors, a multi-processor core, or some other type of processor, depending on the particular implementation. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and other suitable information either on a temporary basis or a permanent basis. Storage devices 616 also may be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output (I/O) unit 612 allows for input and output of data with other devices that may be connected to data processing system 600. For example, input/output (I/O) unit 612 may provide a connection for user input through a keyboard, a mouse, and/or some other suitable input device. Further, input/output (I/O) unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 for execution by processor unit 604. The processes of the different embodiments may be performed by processor unit 604 using computer-implemented instructions, which may be located in a memory, such as memory 606.

These instructions are referred to as program instructions, program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these examples. In one example, computer readable media 620 may be computer readable storage media 624 or computer readable signal media 626.

Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600. In some instances, computer readable storage media 624 may not be removable from data processing system 600.

In these examples, computer readable storage media 624 is a physical or tangible storage device used to store program code 618 rather than a medium that propagates or transmits program code 618. Computer readable storage media 624 is also referred to as a computer readable tangible storage device or a computer readable physical storage device. In other words, computer readable storage media 624 is a media that can be touched by a person.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to and/or in place of those illustrated for data processing system 600. Other components shown in FIG. 6 can be varied from the illustrative examples shown. The different embodiments may be implemented using any hardware device or system capable of running program code. As one example, data processing system 600 may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 618 may be omitted, because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system.

Additionally, communications unit 610 may include a number of devices that transmit data, receive data, or both transmit and receive data. Communications unit 610 may be, for example, a modem or a network adapter, two network adapters, or some combination thereof. Further, a memory may be, for example, memory 606, or a cache, such as that found in an interface and memory controller hub that may be present in communications fabric 602.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for lighting a flight deck on an aircraft, comprising:
   identifying, by a processor unit, a status of the aircraft; and
   controlling, by the processor unit, an ambient lighting device on the flight deck in response to the status of the aircraft to indicate the status of the aircraft, the ambient lighting device configured to provide, such that in operation the ambient lighting device provides, ambient lighting as one component of an ambient light on the flight deck,
   wherein controlling the ambient lighting device on the flight deck comprises controlling a spot light and illuminating at least one of: a selected area, and a number of displays on the flight deck, the number of displays are displaying information regarding the status of the number of systems.

2. The method of claim 1 further comprising:
   identifying, by the processor unit, a level of the ambient light on the flight deck; and
   controlling the ambient lighting device on the flight deck in response to the level of the ambient light on the flight deck.

3. The method of claim 1, wherein controlling the ambient lighting device on the flight deck comprises the ambient lighting device being located in at least one of: a ceiling, and on a side wall, of the flight deck, and controlling a number of characteristics of the lighting on the flight deck selected from an intensity of the lighting, a color of the lighting, and a characteristic of changes of the lighting.

4. The method of claim 1, wherein controlling the ambient lighting device on the flight deck comprises controlling the ambient lighting device on the flight deck, in response to the status of the aircraft to indicate the status of the aircraft, and illuminating with the ambient lighting at least one of: a selected display, a selected control, and a selected area on the flight deck.

5. The method of claim 1, wherein the status of the aircraft comprises the status of a number of systems on the aircraft, and the ambient lighting device comprising at least one of: a spot light, and a side wall light.

6. The method of claim 5, wherein controlling the ambient lighting device on the flight deck comprises directing a beam of light to illuminate a selected area on the flight deck.

7. The method of claim 5, wherein controlling the ambient lighting device on the flight deck comprises controlling the spot light and illuminating a number of controls on the flight deck, wherein the number of controls are configured for controlling the number of systems.

8. The method of claim 5, wherein controlling the ambient lighting device on the flight deck comprises controlling on-panel lighting on a panel on the flight deck, wherein the on-panel lighting is associated with a number of controls on the panel, wherein the number of controls are configured for controlling the number of systems.

9. The method of claim 5, wherein controlling the ambient lighting device on the flight deck comprises controlling on-control lighting on a number of controls on the flight deck, wherein the number of controls are configured for controlling the number of systems.

10. The method of claim 9, wherein controlling the ambient lighting device on the flight deck comprises controlling the on-control lighting on the number of controls to guide action by a flight crew to use the number of controls to control the number of systems.

11. An apparatus, comprising:
a status identifier configured to identify, such that in operation the status identifier identifies, a status of a platform; and
a lighting control signal generator configured to generate, such that in operation the lighting control signal generator generates, lighting control signals for controlling an ambient lighting device on the platform in response to the status of the platform to indicate the status of the platform, the ambient lighting device providing ambient lighting as one component of an ambient light on the flight deck,
wherein controlling the ambient lighting device on the flight deck comprises controlling a spot light and illuminating at least one of: a selected area, and a number of displays on the flight deck, the number of displays are displaying information regarding the status of the number of systems.

12. The apparatus of claim 11, wherein the lighting control signal generator is configured to generate, and in operation generates, the lighting control signals for controlling the ambient lighting device, on the platform, in response to an level of the ambient light on the platform, the ambient lighting device being located in at least one of: a ceiling, and on a side wall, of the platform.

13. The apparatus of claim 11, further comprising the lighting control signal generator being configured to generate, such that in operation the lighting control signal generator generates, the lighting control signals for controlling a number of characteristics of the ambient lighting device on the platform selected from an intensity of the lighting, a color of the lighting, and a characteristic of changes of the ambient lighting.

14. The apparatus of claim 12, further comprising the lighting control signal generator being configured to generate, such that in operation the lighting control signal generator generates, the lighting control signals for controlling the ambient lighting device as from a spot light that directs a beam onto at least one of: a portion of one or more of control, and a particular area on a panel, on the platform.

15. The apparatus of claim 11, further comprising:
the status identifier being configured to identify, such that in operation the status identifier identifies, the status of a number of systems on the platform; and
the lighting control signal generator being configured to generate, such that in operation the lighting control signal generator generates the lighting control signals for controlling the ambient lighting device associated with a number of displays on the platform, wherein the number of displays are configured to display information regarding the status of the number of systems.

16. The apparatus of claim 11, further comprising:
the status identifier being configured to identify, such that in operation the status identifier identifies, the status of a number of systems on the platform; and
the lighting control signal generator generates the lighting control signals for controlling the ambient lighting device associated with a number of controls on the platform, wherein the number of controls are configured for controlling the number of systems.

17. The apparatus of claim 11, wherein the platform is an aircraft and the lighting control signal generator being configured to generate, such that in operation the lighting control signal generator generates, lighting control signals for controlling the ambient lighting device on a flight deck on the aircraft to indicate the status of the aircraft.

18. A method for controlling an ambient lighting device on a platform, comprising:
identifying, by a processor unit, a status of a number of systems on the platform; and
controlling, by the processor unit, the ambient lighting device on the platform associated with a number of controls on the platform in response to the status of the number of systems, the number of controls controlling the number of systems, the ambient lighting device providing ambient lighting as one component of an ambient light on the flight deck,
wherein controlling the ambient lighting device on the flight deck comprises controlling a spot light and illuminating at least one of: a selected area, and a number of displays on the flight deck, the number of displays are displaying information regarding the status of the number of systems.

19. The method of claim 18, wherein the platform is an aircraft and controlling the ambient lighting device on the platform comprises, based on a measured level of ambient light in the aircraft, controlling lighting, associated with the number of controls on a flight deck on the aircraft to guide action by a flight crew to use the number of controls to control the number of systems, the ambient lighting device being located in at least one of: a ceiling, and on a side wall, of the platform.

* * * * *